Aug. 31, 1965     J. S. SHAW ETAL     3,203,116
STUDENT TEST SHEETS
Filed March 28, 1963

INVENTORS
JOHN J. DOSTAL,
JOHN S. SHAW and
DONALD K. WHITE
BY Heidelman & Wolffe
ATTORNEYS

United States Patent Office 3,203,116
Patented Aug. 31, 1965

3,203,116
STUDENT TEST SHEETS
John S. Shaw, Kensington, Md., John J. Dostal, Long Island, N.Y., and Donald K. White, Fairfax, Va., assignors, by mesne assignments, to Acme Visible Records, Inc., Crozet, Va., a corporation of Delaware
Filed Mar. 28, 1963, Ser. No. 268,813
6 Claims. (Cl. 35—48)

This invention relates to a student test sheet, particularly adapted for employment with electromechanical test scoring or grading equipment for automatic grading of the test answers.

In recent years, school administrations and teachers have recognized with dismay how large a proportion of the teachers' time is spent performing necessary, but non-professional duties. Particularly burdensome, is the time it takes to grade test papers. As an illustration, a junior high school teacher can have two hundred student papers to grade. As a scoring rate of one minute per sheet, grading this many papers will require over three hours. Under such circumstances, daily quizzes are a hardship and even weekly quizzes are burdensome.

The widespread appreciation and comprehension of the problem has given rise to various forms of mechanical, electrical and electromechanical educational test devices adapted to automatically score true-false and multiple choice quizzes. The present invention relates to a test scoring sheet particularly adapted to accurate scoring in a test grading machine of the electromechanical type.

Desirably, the present answer sheet is marked by means of an ordinary lead pencil (No. 2 medium or softer). Advantageously, the student can erase what he believes to be an incorrect answer and substitute therefor a different answer.

Still another advantage of the present test scoring sheet is the ability to use, for such sheet, ordinary ledger stock cut into conventional sized sheets, e.g. 8½ x 11 inches. Desirably, a substantial number of questions, e.g. 50, may be answered on a sheet of this size. A perhaps minor advantage of the present invention, is that sheets of such size are not unfamiliar to the past experience of the student, as would be, for example, a punched card.

For further understanding of the present invention, reference is made to the accompanying drawing, wherein is illustrated, the test scoring sheet according to the present invention.

The basic sheet 10 is made from a moderately good grade of paper such as might be employed for permanent records. Exemplarily, a suitable paper would be 24 lb. #4 ledger stock.

As shown on the drawing, suitable identifying indicia may be imprinted with instructions for placement of the student's name, the test subject, the date, the ultimate grade and also test instructions, numbering of the questions, etc.

The marking features of the present invention are the test answer spaces constituted by the paired half-blocks 12 which are lined up in columns 14 and in rows 16 throughout the page. As can be seen from the drawing, the individual rows provide for multiple answers or, if desired, just a pair of true-false answers for each of 50 questions.

The individual half-blocks 12a and 12b are separated so that the student may fill the space therebetween with an ordinary lead pencil (#2 medium or softer) in the blocks corresponding to the correct answer. Importantly, the individual half-blocks are imprinted upon the paper with a conductive ink, preferably black. Electrical resistance of the conductive half-block 12a or 12b must be below 20,000 ohms when measured with a pair of copper fingers spaced ½₂" apart, the fingers having cross sectional dimensions of .015" x .156" and being applied with a finger pressure of 4 oz. per finger. Other equivalent conductivity tests may, of course, be employed.

Disposed at the bottom of sheet 10 are a pair of registry pin openings or slots 20 and 22. Desirably, these openings are of the shapes shown so that the paper can be inserted accurately in the scoring machine.

The test sheet and the machine which scores the test are interrelated. Necessarily, the test sheet is intended for use in a particular type of machine even though the machine per se forms no part of this invention. For purposes of the present invention, however, it is necessary only to bear in mind that the type of test scoring machine for which the present sheet is adapted must be of the electromechanical type wherein a pair of pins pick up the sheet at openings 20, 22 and a conveying mechanism, suitably driven, passes the sheet under paired sensing fingers (a pair for each block 12). The fingers are connected to an electrical circuit which will determine that Question 1A has been filled in, while the half blocks for question answers 1B, 1C, and 1D have not been joined by pencil markings. Suitably, therefore, the pair of sensing fingers, one in each half-block 12a and 12b will determine whether the student has filled in the space in that individual block through a sharp drop in the electrical resistance thereacross; as many fingers as there are half blocks on a line will be provided. Normally, the correctness of the answers is suitably impressed into the circuitry so that the paper will be scored as a whole. A machine adapted for use with the present answer sheet is the "Grade Master" manufactured by Electronic for Education, Inc. of Kensington, Maryland.

This particular machine electromechanically compares the student's test sheet, question by question, against a teacher's answer sheet. To achieve the desired results, this machine and indeed any test scoring machine of like nature, must solve the problem of attaining accurate registry of the answer sheet and the student's sheet in the machine so that the machine invariably will sense and score the same questions on each sheet. Special provision has been made in the present answer sheet to achieve accurate registry, which provisions involve principally the shape and spacing of slots 20, 22 and their relation to the half-blocks 12.

As shown on the drawing slot 20, the slot which may be considered as the primary slot, is of a generally triangular configuration with a rounded apex portion 24 positioned toward the adjacent edge end of sheet 10. The tapered side walls of slot 20 serve as guiding surfaces during interengagement of a round registry pin (shown at 26) with sheet 10, the pin ultimately seating in the rounded apex portion 24 at the base of slot 20. Secondary slot 22 is of generally rectangular configuration, the side edges of which are generally parallel to the side edges of sheet 10. During interengagement a square or rectangular registry pin (shown at 28) fits into slot 22, seating ultimately on the base or bottom edge 30 of slot 22. Thus, the two registry slots 20, 22 which are intended to fix the position of sheet 10 in the ultimate scoring machine, serve as reference points, the sheet structure as a whole being reproducibly related to the slots 20, 22.

As shown on the drawing, a pair of registry lines X and Y are employed as the base lines for the sheet structure. Line X passes from the apex of slot 20 axially of triangular shaped registry slot 20, bisecting same. The Y base line passes along base of the bottom edge of registry slot 22 and also contacts the apex edge of conical opening 20 (being tangent thereto). The closest side edge (32) of registry opening 22 is positioned at a predetermined distance from base line X to within .005". The individual blocks 12 are all spaced apart in predetermined relation to base lines X and Y to within 0.005".

Thus, to repeat, the important relationships in the sheet are the accuracy with which the registry slots 20, 22 are spaced apart (e.g. 7.56" ± 0.005" for the Grademaster machine) the desired distance and the accuracy with which the individual blocks 12 (0.375" x .156" for the Grademaster machine) are spaced from each other and from registry slots 20, 22. The same degree of spacing accuracy of slots to the side edges and top and bottom edges of the sheet is not necessary (e.g. ± 0.02"), this lesser degree of accuracy being where compensation is made for the small sheet variation. Similarly, the actual printing on the sheet (e.g. question numbers, directions for use, etc.) need not be imprinted with such high accuracy. Ordinary printing tolerances suffice, although as a precaution, a non-conductive ink should be employed for the printed matter.

As a further precaution to insure proper and accurate registry, care is taken to minimize dimensional changes in the answer sheet attributable to temperature, humidity induced expansion, or contraction. The tolerances given above are for standardized conditions (e.g. 73° F. ± 3° and 50% ± 5% relative humidity) which do not differ substantially from comfortable school room conditions. However, to avoid error should temperature, humidity conditions of use and scoring cause dimesional changes, the sheet is cut and printed grain short, i.e. the grain running along the 8½" dimension of an 8½" by 11" sheet. In consequence, expansion or contraction is longidudinal of the sheet, perpendicular to base line Y. This circumstance does not affect the relative spacing distance of registry slots 20, 22; nor, therefore, registry of sheet 10 in the test scoring machine. In passing, it is noteworthy that the longitudinal expansion does not upset the scoring even of answers to questions 1, 26 at the opposite end of sheet 10 because in the Grademaster type of machine, the scoring is effected by comparison against a teacher's sheet and the teacher's sheet is subject to the same temperature, humidity conditions and will expand or contract just as the student's answer sheet does.

Allusion has already been made to how half blocks 12a, 12b are formed from conductive ink so as to have less than 20,000 ohms resistance. Imprinting such blocks does not present any unusual problems, electrically conductive inks being available commercially. For example blocks 12 have been satisfactorily printed from die plates using IPI conductive black ink (BL 12230) of Interchemical Corporation, New York, New York.

While the foregoing description of the invention has been in terms of preferred embodiments thereof, it should be understood that the invention is not restricted thereto. Minor variations in structure are contemplated within the scope of the invention. Thus, for example, the registry slots 20, 22 may be placed at the top of the sheet or that different geometric forms may be employed for the slot shape.

What is claimed is:

1. A test answer sheet adapted for electromechanically scoring which comprises a generally rectangular sheet of paper having a plurality of test answer spaces defined by printed markings on said sheet, said spaces being arranged in rows and columns and having a predetermined accurate spaced apart relationship; a primary registry slot adapted to receive a cylindrical pin of appreciably smaller cross-sectional area than the area of said primary slot, and a secondary registry slot adapted to receive a rectangular pin of appreciably smaller cross-sectional area than the area of said secondary slot, said slots being positioned immediately adjacent to one end of said sheet, at opposite corners thereof, the primary slot being of a generally triangular configuration with side walls tapering to a rounded apex portion towards said end of said sheet and adapted thereat to snugly receive and seat said cylindrical pin, said tapered side walls of the primary slot acting as sheet guide surfaces, said secondary slot being of a generally rectangular configuration wherein the walls are disposed generally parallel to the edges of the sheet and to the sides of said rectangular pin, said slots and answer spaces being spaced relative to a first base line which joins one wall of the secondary slot to the rounded apex portion of the primary slot and to a second base line bisecting the rounded apex portion of the first slot and perpendicular to the first base line in a parallel relationship to said columns, whereby each such sheet upon being placed within a test scoring machine may be guided by the slots into reproducibly accurate registration of the test answer spaces thereon to the scoring mechanism of the machine.

2. The test scoring sheet of claim 1, wherein the printed markings defining each answer space are in the form of half blocks spaced apart a predetermined distance, the said printed markings being formed of electrically conductive ink exhibiting an electrical resistance less than 20,000 ohms across the half block.

3. The test scoring sheet of claim 1, wherein the fibers of the paper are generally parallel to the base line joining the registry slots, whereby expansion and contraction of the sheet due to humidity changes is least in the direction of this base line, and the spacing apart of the slots changes little with humidity changes.

4. A test answer sheet adapted for electromechanical scoring which comprises a sheet of paper containing therein a pair of registry slots positioned in adjacent corners of the sheet, one slot being of generally triangular configuration and adapted to receive a cylindrical pin of appreciably smaller cross-sectional area than the area of said slot, with a rounded apex portion thereof adapted to seat said pin and disposed toward an edge of the sheet adjacent to said slots, the other slot being of rectangular construction and adapted to receive an aligned rectangular pin of appreciably smaller cross-sectional area than the area of said rectangular slot, the two slots being spaced relative to one base line which joins a bounding edge of the rectangular slot to the apex of the conical slot and to a second base line extending axially of the conical slot and vertically of the first base line, the slot spacing being in a predetermined relationship accurate to at least about 0.005 inch, and a series of paired spaced apart half-blocks disposed in rows and columns within a predetermined sizing and spacing relationship accurate to at least about 0.005 inch, each half block being imprinted with a conductive ink, whereby the sheet can be disposed in a test scoring machine for accurate determination of which blocks were joined electrically by the conductive indicia placed therein by a student selectively pencilling in the space between paired half-blocks as answers to a test.

5. The test scoring sheet of claim 4, wherein the paper has been printed grain short whereby fibers are generally parallel to the base line joining the registry slots and expansion and contraction of the sheet due to humidity changes is least in the direction of this base line.

6. The test scoring sheet of claim 1, wherein said slots are spaced relative to each other and to said columns and rows of test answer spaces in a predetermined relationship accurate to at least about 0.005 inch.

References Cited by the Examiner

UNITED STATES PATENTS

| | | | |
|---|---|---|---|
| 2,048,976 | 7/36 | Sveda et al. | 35—48 |
| 2,263,799 | 11/41 | Daley | 282—29 |
| 2,310,437 | 2/43 | Johnson | 35—48 |
| 2,626,858 | 1/53 | McGraw et al. | 101—426 |
| 2,760,273 | 8/56 | Bregman. | |
| 3,047,311 | 7/62 | Lyall et al. | 281—43 X |

OTHER REFERENCES

Pulp and Paper, vol. III, Casey, Rec. Patent Office 9/61, page 1822 relied on.

JEROME SCHNALL, *Primary Examiner.*

LAWRENCE CHARLES, *Examiner.*